June 27, 1950 M. M. LEVY 2,512,658

AMPLITUDE CONTROL OF ELECTRIC OSCILLATIONS

Filed Feb. 27, 1943 2 Sheets-Sheet 1

Inventor
Maurice Moise Levy
By George J. Hyde
Attorney

Inventor
Maurice Moise Levy
By George J. Hyde
Attorney

Patented June 27, 1950 2,512,658

UNITED STATES PATENT OFFICE 2,512,658

AMPLITUDE CONTROL OF ELECTRIC OSCILLATIONS

Maurice Möise Levy, London, England, assignor, by mesne assignments, to International Standard Electric Corporation, New York, N. Y., a corporation of Delaware Application February 27, 1943, Serial No. 477,390
In Great Britain April 17, 1942

2 Claims. (Cl. 178—44)

The present invention relates to arrangements for stabilizing the amplitude of the waves generated by variable frequency thermionic valve oscillators.

It is common practice to adjust the frequency of valve oscillators by varying one or more of the components of the tuned circuit which determines the frequency. It is generally found, however, that without some stabilizing means, the amplitude of the oscillations varies very considerably as the frequency is changed. It is possible to co-ordinate the changes in the tuned circuit elements in such a way that the amplitude remains constant independently of the frequency setting, but the arrangements are complex and often impracticable.

Automatic stabilizing means involving the use of a diode shunting the tuned circuit have accordingly been tried in the past, but while such arrangements have produced some improvement, insufficient stabilization for many purposes is obtained.

The principal object of the invention, therefore, is to provide more efficient stabilizing arrangements whereby the output of an oscillator may be rendered substantially constant over a wide frequency band.

According to the invention, an arrangement for stabilizing the amplitude of the waves generated by a variable frequency oscillator comprises a thermionic rectifying valve to provide a load for shunting the tuned circuit which defines the frequency (or for shunting at some point a circuit supplied with waves from the oscillator), and an amplifier-detector circuit adapted to control the rectifying valve according to the amplitude variation of the alternating voltage developed in the tuned circuit (or at the said point in the circuit).

The invention will be more clearly understood from the following detailed description with reference to the accompanying drawings in which—

Figures 1, 2, 3:
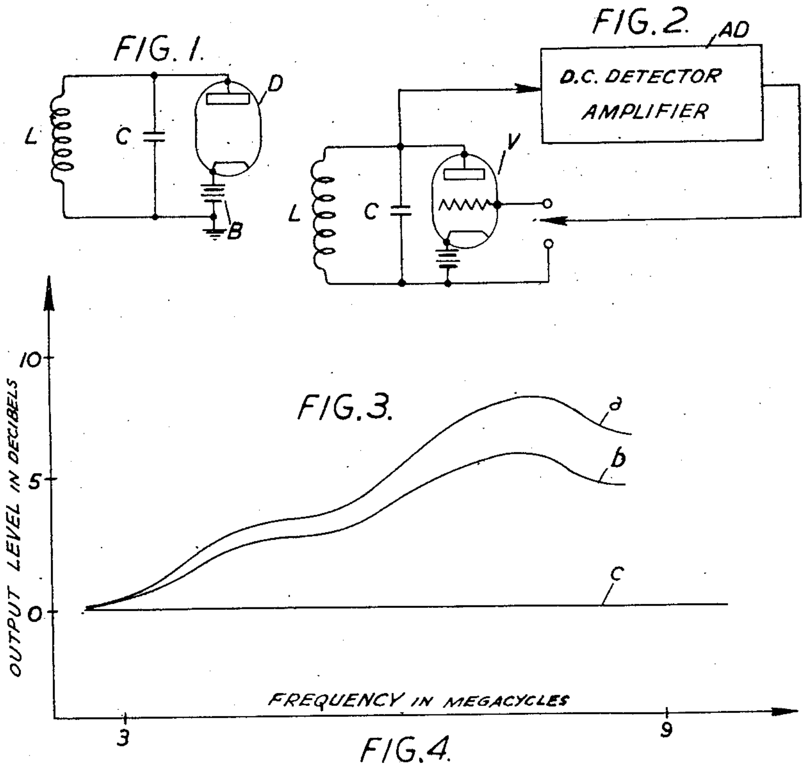
Figs. 1 and 2 show schematic circuit diagrams used for explaining the principles of the invention.
Fig. 3 shows curves indicating the degree of stabilization produced according to the invention and by existing methods.

Fig. 1 shows a parallel tuned circuit consisting of an inductance L and a capacity C, such as is commonly associated with a thermionic valve (not shown) to generate oscillations. The frequency is usually varied by changing L or C or both by suitable means. One method hitherto used for stabilizing the amplitude of the oscillator consists in shunting the tuned circuit L, C with a diode D, the cathode of which is biased positively by a battery B or other suitable means. The voltage of this battery is chosen to be slightly less than the desired maximum voltage generated in the tuned circuit. If the amplitude of the oscillations should tend to increase when the frequency is changed, the diode D will become conducting for the positive half waves and will act as a load on the tuned circuit which increases as the amplitude increases. It therefore tends to limit the amplitude of the oscillations. However, experience shows that the stabilizing control is not very great, and considerable amplitude variations still occur. An example is shown in Fig. 3, where the curve *a* shows the variation of the output voltage of a particular oscillator expressed as a level in decibels referred to an arbitarary zero level when the frequency is varied over a range of 3 to 9 megacycles per second, there being no amplitude limitation. Curve *b* shows the variation obtained with a simple diode control as just described. The improvement is clearly not very great.

Fig. 2 shows diagrammatically the method of stabilizing the amplitude of the oscillations, according to the invention. The effectiveness of the control is greatly increased by using a triode valve V to shunt the tuned circuit instead of a diode, and by applying to the control grid the amplified and rectified variations of the oscillating voltage by means of the amplifier detector A connected as shown. This can be most easily appreciated in the following way. Let $v$ be a variation in the amplitude of the oscillating voltage. This will be detected and amplified in AD and will be multiplied by some factor $\mu_1$, becoming $\mu_1 v$. This voltage is applied to the grid of the valve V and produces the damping effect on the tuned circuit as another voltage P applied to the plate of valve V and equal to $\mu_1 v$ multiplied by another factor $\mu_2$; thus $P=\mu_1\mu_2 v$. It is evident that a much greater load will be placed on the tuned circuit for the same value of $v$ with the arrangement of Fig. 2, than with that of Fig. 1, and accordingly a much more effective stabilizing control is obtained. Many standard triode valves have a value of $\mu_2$ as high as 50, and $\mu_1$ may easily be made equal to 10. A multiplication of 500 is thus obtainable. The amplitude variation which may be obtained with the previously quoted oscillator when employing the arrangement of Fig. 2 is shown by the curce *c* in Fig. 3, in which the variation over the whole frequency band is less than 0.05 decibel.

Figure 4:
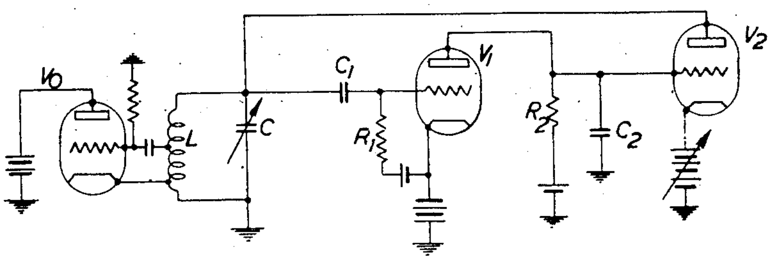
Fig. 4 shows a simplified schematic circuit diagram of an embodiment.

Fig. 4 shows a simplified diagram of a practical circuit according to the invention, and is generally in accordance with Fig. 2. $V_0$, $V_1$, and $V_2$ are respectively the oscillator valve, a detector-amplifier valve and the control valve. The oscillating voltage is applied to the control grid of the valve $V_1$ through a condenser $C_1$, and $R_1$ is the grid leak resistance. The values of $R_1$ and $C_1$ are chosen so that the time constant $R_1$, $C_1$ is much greater than the period of the lowest frequency generated by the oscillator. The resistance $R_1$ should preferably be several megohms.

The control grid of $V_1$ is biassed positively with respect to the cathode through the resistance $R_1$ so as to produce a very small grid current. When the oscillator voltage is applied to condenser $C_1$, the grid current will increase during the positive cycles of the oscillations and will charge condenser $C_1$ until the difference of potential is nearly equal to the amplitude of the oscillating voltage. This will cause the control grid to become negative to the cathode so that the mean plate current of the valve $V_1$ is decreased and the plate voltage is accordingly increased. The load resistance $R_2$ is shunted by a by-pass condenser $C_2$ so that a continuous voltage will be developed across $R_2$. It should be noted that the plate voltage of the valve $V_1$ varies in the same sense as the oscillatory voltage, and is applied to the control grid of the control valve $V_2$ whose plate is connected back to the tuned circuit L, C. This valve then acts to limit the amplitude of the oscillations in the manner already explained.

The valve $V_1$ acts as a rectifier and a direct current amplifier at the same time. If the resistance $R_2$ is made very large, a small variation of plate current will produce a large voltage variation for controlling the valve $V_2$.

Increased sensitivity can be obtained by using a pentode for the valve $V_1$ instead of a triode. Besides, since this valve operates as a rectifier, it can be used at the same time as a valve voltmeter with the help of a direct current instrument, for the purpose of measuring the amplitude of the oscillators.

Figure 5:
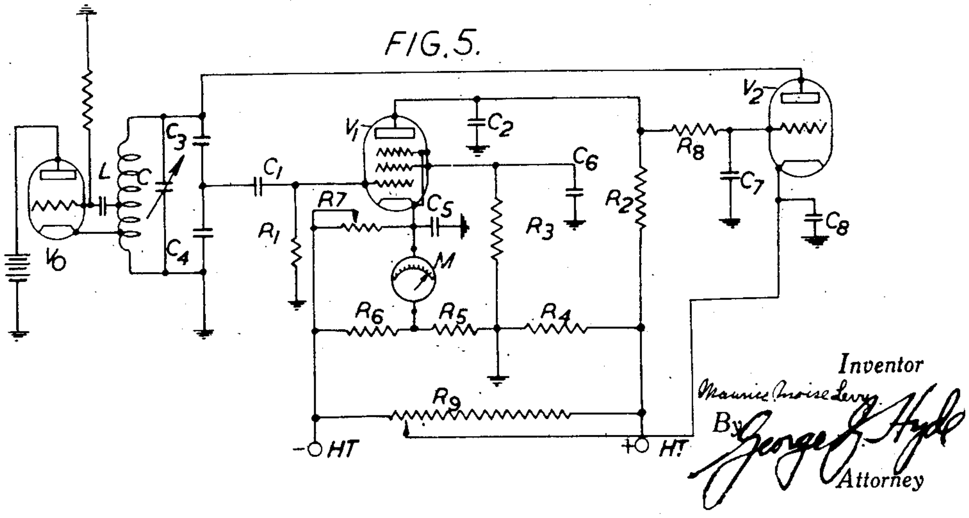
Fig. 5 shows a detailed schematic circuit diagram of the same embodiment.

Fig. 5 shows the details of an actual practical arrangement in accordance with the simplified circuit of Fig. 4 and incorporating also the additional features just mentioned. Corresponding elements are similarly designated in both figures.

In order to prevent overloading of the tuned circuit, a small fraction only of the oscillating voltage is applied to the valve $V_1$ by means of the potential divider comprising the two condensers $C_3$ and $C_4$, of which $C_4$ is large compared with $C_3$. The valve $V_1$ is shown as a pentode in which the cathode, control grid, and screen grid are used as a rectifying triode. The output is, however, taken from the plate, and by using the pentode in this way, the plate voltage variations do not affect the operation of the triode portion. In the arrangement of Fig. 4, the variations of the plate voltage affect the rectifying action of the valve and reduce its sensitivity.

The screen grid is connected to earth through resistance $R_3$ and the cathode is biassed negatively thereto by the potentiometer arrangement, comprising $R_4$, $R_5$, $R_6$ and $R_7$ and the direct current milliammeter M, shunted across the high tension supply. $C_5$ and $C_6$ are the by-pass condensers for the cathode and screen grid, respectively.

The plate of valve $V_1$ is connected to the control grid of $V_2$ through a high resistance $R_8$ with a by-pass condenser $C_7$. The cathode of $V_2$ is suitably biassed by means of a potentiometer $R_9$ shunted across the high tension supply, and $C_8$ is the corresponding by-pass condenser.

The milliammeter M is used for measuring the cathode current of the valve $V_1$ in order to indicate the oscillating voltage. The adjustable resistance $R_7$ is included to provide a balancing current in order to get a zero reading on M when the oscillator voltage is zero. $R_7$ will be adjusted until the cathode is brought to the same potential as the junction of $R_5$ and $R_6$, under this condition.

The bias of the cathode of valve $V_2$ should be adjusted by means of the potentiometer $R_9$ until maximum sensitivity is obtained. It will be clear that if the cathode should be given a positive potential greater than the maximum oscillation voltage there will be no control at all as the valve will always have an infinite impedance. By making the cathode progressively more negative the sensitivity increases until some point is reached at which the load on the tuned circuit becomes so great that it begins to decrease the sensitivity. The best operation point will be just before this occurs. With the circuit as described, and as adjusted in the manner just explained, it is possible to maintain the oscillating voltage constant within about 1%, when it would vary by perhaps 200% without any control.

Although the control arrangements shown in Figs. 4 and 5 employ two valves, the power necessary for operating them can actually be made small compared with the power necessary for the oscillator valve $V_0$. For example, the valve $V_1$ could be a very low power valve whose maximum plate current is not more than, say, 2 milliamperes; and the valve $V_2$ owing to the manner in which it operates will generally draw a plate current of less than 1 milliampere. The potential dividing arrangements can also be arranged so that the total current drain is not more than about 7 milliamperes.

Figure 6:
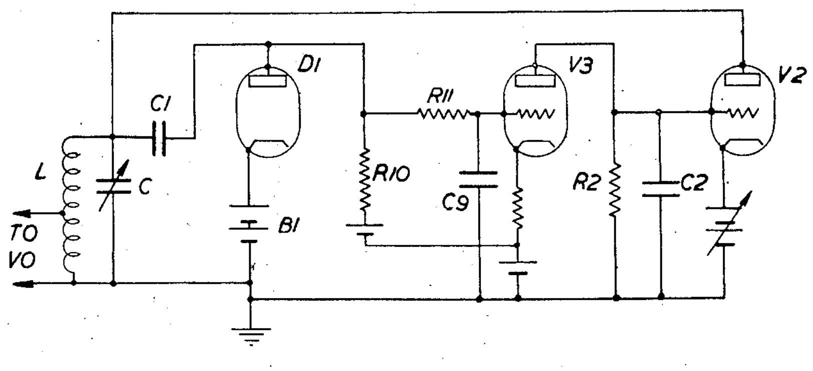
Fig. 6 shows another detailed schematic diagram of the embodiment of Fig. 4.

Fig. 6 shows another practical form of Fig. 4 which has the advantage that only the excess amplitude of the voltage generated in the tuned circuit L, C is used for operating the control circuit instead of the whole amplitude, this arrangement providing a greater sensitivity of control. In this circuit, the valve $V_1$ of Fig. 4 is represented by a direct current amplifier valve $V_3$ and diode $D_1$. The diode $D_1$ is connected across the tuned circuit through the blocking condenser $C_1$ and acts in this case as a rectifier, and not as a limiting load, as in the case of Fig. 1. The cathode is biassed positively by suitable means shown as a battery $B_1$ the voltage of which should be just slightly less than the minimum amplitude of the uncontrolled oscillating voltage in the tuned circuit, taken over the whole frequency range of interest. The diode will accordingly produce a rectified output voltage in the load resistance $R_{10}$ only when the amplitude exceeds this minimum amplitude and the voltage will be proportioned to the excess amplitude instead of to the whole amplitude.

The voltage developed across $R_{10}$ is smoothed in the circuit comprising the resistance $R_{11}$ and condenser $C_9$, and is applied to a valve $V_3$ arranged as a direct current amplifier, producing an amplified continuous voltage across the load resistance $R_2$ shunted by the by-pass condenser $C_2$, and is applied to the control valve $V_2$ which then operates as previously described.

This arrangement avoids the necessity for stepping down the input voltage as was done in Fig. 5 by means of the potentiometer $C_3$, $C_4$, and by blocking out the major portion of the oscillating voltage by means of the battery $B_1$ (or equivalent biassing arrangement) the percentage variation available for control is greatly increased. This circuit is accordingly more sensitive than that of Fig. 5 and controls the output level within narrow limits.

Figs. 5 and 6 show only two practical arrangements according to the invention. The power supply and other like details may be provided in any of a number of well known ways. The amplifier detector AD (Fig. 2) which is represented by a single valve $V_1$ in Fig. 5 and by two valves in Fig. 6 could comprise several further valve stages if desired.

In case the arrangement is used to control a power oscillator, the control valve $V_2$ may operate with grid current over part of the cycle. In such a case it would be advisable to interpose before the valve $V_2$ an impedance reducing stage, for example by means of a cathode follower valve arranged in the well known way.

Moreover, the same arrangement could be applied to stabilize the output of an amplifier, or the level at some other point in a system associated with an oscillator. The terminals of the potential divider $C_3$, $C_4$ in Fig. 5, or the diode $D_1$ in Fig. 6, would in that case be connected to the output terminals of the amplifier, or at some other stabilizing point, instead of to the condenser C as shown.

The invention is not intended to be limited to the embodiments described as examples, and various modifications will occur to those skilled in the art.

What is claimed is:

1. A circuit for stabilizing the amplitude of the waves at a point in a circuit transmitting waves generated by a variable frequency oscillator comprising a first thermionic rectifying valve having its plate-cathode circuit connected to provide a load for shunting the circuit at the said point, a second thermionic valve arranged to rectify the alternating voltage and to produce therefrom an amplified continuous voltage, said valve being connected so as to supply said continuous voltage to the input circuit of said first thermionic valve, a potential divider through which the alternating voltage is applied to said second valve, the control grid thereof being connected to an intermediate point on said potential divider, and direct current measuring means connected in the cathode circuit of said second valve for the purpose of indicating the alternating voltage of the stabilized waves.

2. A circuit according to claim 1, in which balancing means are provided for reducing the reading of the measuring instrument to zero when no alternating voltage is applied to the control grid of the second valve.

MAURICE MÖISE LEVY.

REFERENCES CITED

The following references are of record in the file of this patent:

UNITED STATES PATENTS

| Number | Name | Date |
|---|---|---|
| 2,049,179 | Stallard | July 28, 1936 |
| 2,144,995 | Pulvari-Pulvermacher | Jan. 24, 1939 |
| 2,247,468 | Barr et al. | July 1, 1941 |
| 2,263,683 | Rockwell | Nov. 25, 1941 |
| 2,272,788 | Bishop | Feb. 10, 1942 |
| 2,343,207 | Schrader et al. | Feb. 29, 1944 |
| 2,373,997 | Boykin | Apr. 17, 1945 |

FOREIGN PATENTS

| Number | Country | Date |
|---|---|---|
| 425,308 | Great Britain | Mar. 7, 1935 |